(12) United States Patent
Abe et al.

(10) Patent No.: US 11,260,487 B2
(45) Date of Patent: Mar. 1, 2022

(54) MACHINE-TOOL SEAL MEMBER

(71) Applicant: BANDO CHEMICAL INDUSTRIES, LTD., Hyogo (JP)

(72) Inventors: Yuki Abe, Hyogo (JP); Nariaki Iwasaki, Hyogo (JP); Masatoshi Kannaka, Hyogo (JP)

(73) Assignee: Bando Chemical Industries, Ltd., Kobe (JP)

(*) Notice: Subject to any disclaimer, the term of this patent is extended or adjusted under 35 U.S.C. 154(b) by 362 days.

(21) Appl. No.: 16/065,574

(22) PCT Filed: Nov. 8, 2016

(86) PCT No.: PCT/JP2016/083090
§ 371 (c)(1),
(2) Date: Jun. 22, 2018

(87) PCT Pub. No.: WO2017/110275
PCT Pub. Date: Jun. 29, 2017

(65) Prior Publication Data
US 2020/0262017 A1 Aug. 20, 2020

(30) Foreign Application Priority Data
Dec. 24, 2015 (JP) .............................. JP2015-251378

(51) Int. Cl.
*B23Q 11/08* (2006.01)
(52) U.S. Cl.
CPC ................... *B23Q 11/0875* (2013.01)
(58) Field of Classification Search
CPC ... F16J 15/32; F16J 15/18; F16J 15/44; F01D 11/02; B23Q 11/08; B23Q 11/0875
See application file for complete search history.

(56) References Cited

U.S. PATENT DOCUMENTS 3,771,799 A * 11/1973 Sekulich ................ F16J 15/006
277/346
4,522,411 A * 6/1985 Burgan ................ F16J 15/3244
277/552
(Continued)

FOREIGN PATENT DOCUMENTS

JP          61081846 U      5/1986
JP          04102767 A  *   4/1992
(Continued)

OTHER PUBLICATIONS

International Search Report PCT/JP2016/083090 dated Jan. 24, 2017.
(Continued)

*Primary Examiner* — Gilbert Y Lee
(74) *Attorney, Agent, or Firm* — Millen, White, Zelano & Branigan, P.C.; William Nixon; Christin Montfort

(57) ABSTRACT

A sealing member for machine tools is capable of keeping sealing performance. The sealing member includes a support member and an elastic member formed in a flat plate shape. The elastic member includes an edge portion to slide on a sliding surface of a machine tool. The support member has a support surface facing a part of a front surface of the elastic member. The sealing member is mounted to the machine tool such that the elastic member is sandwiched between a mount portion of the machine tool and the support surface of the support member. The elastic member has a fixed portion sandwiched between the mount portion and the support member. A lip portion not sandwiched between the mount portion and the support member when the sealing member is mounted to the machine tool, the lip portion including the edge portion and configured to be curved.

6 Claims, 10 Drawing Sheets

(56) References Cited

U.S. PATENT DOCUMENTS

| | | | | |
|---|---|---|---|---|
| 4,721,314 | A | * | 1/1988 | Kanayama ............ F16J 15/3252 |
| | | | | 277/562 |
| 4,822,059 | A | * | 4/1989 | Shimasaki ............ F16J 15/3232 |
| | | | | 277/564 |
| 6,517,082 | B2 | * | 2/2003 | Yamada ................ F16J 15/322 |
| | | | | 277/559 |
| 6,517,083 | B2 | * | 2/2003 | Yamada ................ F16J 15/3228 |
| | | | | 277/559 |
| 9,016,696 | B2 | * | 4/2015 | Borowsky .......... H05K 7/20736 |
| | | | | 277/637 |
| 10,041,596 | B2 | * | 8/2018 | Koch ...................... B65G 15/54 |
| 2004/0160014 | A1 | * | 8/2004 | Uhrner ................ B25B 27/0028 |
| | | | | 277/549 |
| 2017/0008140 | A1 | * | 1/2017 | Abe .................... B23Q 11/0825 |

FOREIGN PATENT DOCUMENTS

| | | | |
|---|---|---|---|
| JP | H08011034 | A | 1/1996 |
| JP | H08085039 | A | 4/1996 |
| JP | 2001310238 | A | 11/2001 |
| JP | 2003053641 | A | 2/2003 |
| JP | 2007083344 | A | 4/2007 |
| JP | 2007290070 | A | 11/2007 |
| WO | 2015119030 | A1 | 8/2015 |

OTHER PUBLICATIONS

English Machine Translation for JP-2007-290070, Publication Date: Nov. 8, 2007.
English Machine Translation of for JP-2007083344, Publication Date: Apr. 5, 2007.
English Machine Translation for JP-2001-310238, Publication Date: Nov. 6, 2001.
English Machine Translation for JP-H08-085039, Publication Date: Apr. 2, 1996.
English Machine Translation for JP-H08-011034, Publication Date: Jan. 16, 1996.
English Machine Translation for JP-2003053641, Publication Date: Feb. 26, 2003.
English translation of Office Action dated Oct. 22, 2019, issued for the corresponding Korean patent application No. 10-2018-7015485 (pp. 1-3).
Extended EP search report in corresponding EP16878173.0 dated Jun. 24, 2019 (pp. 1-5).

\* cited by examiner

MOVING DIRECTION

MOVING DIRECTION

MACHINE-TOOL SEAL MEMBER

TECHNICAL FIELD

The present invention relates to a sealing member for machine tools.

BACKGROUND ART

Machine tools such as a lathe and a machining center is the most basic machine device generally used in manufacturing industries. In these machine tools, in order to protect a driving mechanism or the like from a chip, coolant (cutting oil) or the like, or in order to remove the chip or the coolant, a sealing member for machine tools (also referred to as a wiper for machine tools) such as a lip seal, a slide seal, a telescopic seal, and a cover seal is used.

For example, a sealing member for machine tools (a wiper for machine tools) disclosed in Patent Literature 1 is known.

Patent Literature 1 discloses a sealing member for machine tools (a wiper for machine tools) 130 shown in FIG. 10. FIG. 10 is a cross-sectional view illustrating one example of a conventional sealing member for machine tools.

As shown in FIG. 10, the wiper for machine tools (hereinafter, also referred to as merely a wiper) 130 is formed in a plate shape. The wiper for machine tools 130 includes a mount portion 131 for mounting the wiper 130 to a machine tool, and a lip portion 132 formed in a plate shape and bent from the mount portion 131.

In the wiper 130, the mount portion 131 is formed of a rubber body with a metal reinforcing plate 134 arranged on a front surface thereof. The rubber body is vulcanized and bonded to the reinforcing plate 134. The lip portion 132 is formed of rubber integrally with the rubber body of the mount portion 131. A groove 135 extended in a longitudinal direction (a penetration direction of a paper) and formed in an arc shape in cross section is formed at a side of the front surface of a connection portion between the mount portion 131 and the lip portion 132. Further, a plurality of screw holes 133 is formed on the mount portion 131.

A metal plate 136 is arranged at a side of a rear surface 132A of the lip portion 132. A front surface of the metal plate 136 is stuck to the rear surface 132A of the lip portion 132 so as to be completely covered by the lip portion 132.

The wiper 130 is mounted to a fixed cover 128 of the machine tool by inserting a screw 141 into the screw hole 133 of the mount portion 131. At this time, the mount portion 131 is mounted such that a vertical surface 131A is arranged along the fixed cover 128 so that the vertical surfaces 131A, 131C of the mount portion 131 are arranged orthogonal to a sliding surface 124 of the machine tool.

Further, the lip portion 132 is inclined against the sliding surface 124, and thereby the rear surface 132A of the lip portion 132 is arranged to face the sliding surface 124, and the metal plate 136 stuck to the rear surface 132A is arranged at a lower side of the lip portion 132.

Patent Literature 1 makes the following assertion relating to the wiper 130.

Since the groove 135 is formed in the connection portion between the mount portion 131 and the lip portion 132, the wiper 130 can swing in a vertical direction by relatively small force around the connection portion between the lip portion 132 and the mount portion 131 as a fulcrum. Accordingly, even in a case in which the sliding surface 124 is uneven in the vertical direction, the lip portion 132 is adapted to the sliding surface 124 with a good responsiveness, and therefore the lip portion 132 is not separated from the sliding surface 124.

Patent Literature 2 proposes a wiper for machine tools having a configuration similar to that of the wiper for machine tools disclosed in Patent Literature 1 except that a canvas or the like is arranged in a lip portion instead of the metal plate.

CITATION LIST

Patent Literature

Patent Literature 1: Japanese Unexamined Patent Publication No. 2007-290070

Patent Literature 2: Japanese Unexamined Patent Publication No. 2007-83344

SUMMARY OF INVENTION

Technical Problem

A sealing member for machine tools is used by pressing an end portion of an elastic member (a distal end portion of a lip portion) on a sliding surface of a machine tool with predetermined contact pressure (pressure received by the elastic member from the sliding surface of the machine tool). The predetermined contact pressure described above is normally ensured by setting a distal end pressing amount when mounting the sealing member for machine tools to the machine tool, to a predetermined value.

On the other hand, the sliding surface of the machine tool is not flat, and generally, the sliding surface of the machine tool has unevenness (recess and projection). Thus, it is difficult that the sealing member for machine tools keeps the predetermined contact pressure when in use due to the unevenness of the sliding surface.

In order to deal with this problem, in the sealing member for machine tools (the wiper for machine tools) 130 disclosed in Patent Literature 1, the groove 135 is formed in the connection portion between the mount portion 131 and the lip portion 132. In Patent Literature 1, the lip portion 132 can swing in the vertical direction by relatively small force around the connection portion between the lip portion 132 and the mount portion 131 as a fulcrum, and therefore even in a case in which the sliding surface is uneven in the vertical direction, the lip portion 132 is adapted to the sliding surface 124 with a good responsiveness.

However, it became obvious from the study of the present inventors that a contact portion of the elastic member with the sliding surface is easily worn in the sealing member for machine tools disclosed in Patent Literature 1. The reason of this is believed that the technique in Patent Literature 1 intends to absorb the unevenness of the sliding surface by the connection portion between the mount portion and the lip portion, and therefore in a case in which the unevenness becomes excessively large, the lip portion cannot be adapted to the sliding surface sufficiently, and as a result, the contact pressure of the elastic member (the lip portion) cannot be kept constant.

Here, by setting the contact pressure to be low, the wear of the contact portion can be avoided, however sealing performance of the sealing member for machine tools is deteriorated. Thus, when the contact pressure is set to be low, it becomes difficult to achieve the original purpose of the sealing member for machine tools that protects a driving mechanism or the like of the machine tool from a chip, coolant or the like.

Solution to Problem

The present inventors conducted a study to solve the problem. As a result, the present inventors newly found a sealing member for machine tools having excellent wear resistance in which a change of contact pressure with a sliding surface is small even if the sliding surface of a machine tool is uneven, and then the present inventors completed the present invention.

A sealing member for machine tools of the present invention includes a support member, and an elastic member formed in a flat plate shape, the elastic member having an edge portion to be slid on a sliding surface of a machine tool.

The support member has a support surface facing a part of a front surface of the elastic member.

The sealing member for machine tools is mounted to the machine tool such that the elastic member is sandwiched between a mount portion of the machine tool and the support surface of the support member.

The elastic member has a fixed portion sandwiched between the mount portion and the support member and a lip portion not sandwiched between the mount portion and the support member when the sealing member for machine tools is mounted to the machine tool, the lip portion including the edge portion and configured to be curved.

In the sealing member for machine tools of the present invention, the elastic member, which is a flat plate shape before mounted to the machine tool (before the edge portion of the elastic member is contacted with the sliding surface of the machine tool) is mounted to the machine tool such that the lip portion is curved when the edge portion is pressed against a sliding surface of the machine tool. Further, the sealing member for machine tools is used in a state in which the lip portion is curved.

Even if the unevenness is formed on the sliding surface of the machine tool, the sealing member for machine tools can absorb the unevenness by a whole of the lip portion of the elastic member. Thus, in the sealing member for machine tools, even if the unevenness is formed on the sliding surface of the machine tool, a change of contact pressure in the edge portion can be made extremely small. Accordingly, in the sealing member for machine tools of the present invention, the edge portion slid on the sliding surface of the machine tool is hardly worn, and therefore sealing performance can be kept for a long period of time.

Such an effect becomes more remarkable as a distal end pressing amount of the lip portion in mounting the sealing member for machine tools to the machine tool becomes large.

Further, since the elastic member of the sealing member for machine tools is formed in a flat plate shape, it is not necessary to produce the elastic member by preparing a molding die for each product, contrary to the elastic member (a rubber body formed of a body portion and a lip portion) of the sealing member for machine tools disclosed in each of Patent Literatures 1 and 2. The elastic member formed in a flat plate shape can be produced by producing a sheet like component formed of an elastic material and cutting the obtained sheet like component into a predetermined size. Thus, the sealing member for machine tools has excellent productivity, and the sealing member for machine tools can be adapted to a design change easily.

In the sealing member for machine tools, it is preferable that the support member has a protection portion arranged at a side opposite to the support surface.

In this case, the exposed front surface of the elastic member can be protected from a chip when in use of the sealing member for machine tools. Thus, it can be suppressed that the elastic member is damaged due to the collision of the chip when in use.

In the sealing member for machine tools, it is preferable that the support surface of the support member and the front surface of the elastic member are joined via an adhesive layer.

In this case, the coolant is hardly entered into a driving mechanism or the like of the machine tool through between the support member and the elastic member. Accordingly, the sealing member for machine tools has further excellent sealing performance.

It is preferable that the sealing member for machine tools further includes a curve auxiliary member at a side of a rear surface of the elastic member, and the curve auxiliary member includes a body portion formed in a flat plate shape and an auxiliary portion extended from the body portion toward a side of a curve of the elastic member.

In this case, when the sealing member for machine tools is mounted to the machine tool, the elastic member is easily curved in a predetermined direction, and it can be avoided that a direction to be curved is erroneously set.

Further, with the curve auxiliary member, reverse of the direction of the elastic member, or turn-up of the sealing member for machine tools (the elastic member) is hardly generated.

In the sealing member for machine tools, it is preferable that a rear surface of the elastic member and a body portion of the curve auxiliary member are joined via an adhesive layer.

In this case, the coolant is hardly entered into a driving mechanism or the like of the machine tool through between the elastic member and the curve auxiliary member. Accordingly, the sealing member for machine tools has further excellent sealing performance.

Advantageous Effects of Invention

In the sealing member for machine tools of the present invention, the edge portion to be slid on the sliding surface of the machine tool is hardly worn, and therefore sealing performance can be kept for a long period of time.

DESCRIPTION OF EMBODIMENTS

Hereinafter, sealing members for machine tools according to embodiments of the present invention are described with reference to drawings.

First Embodiment

Figure 1A:
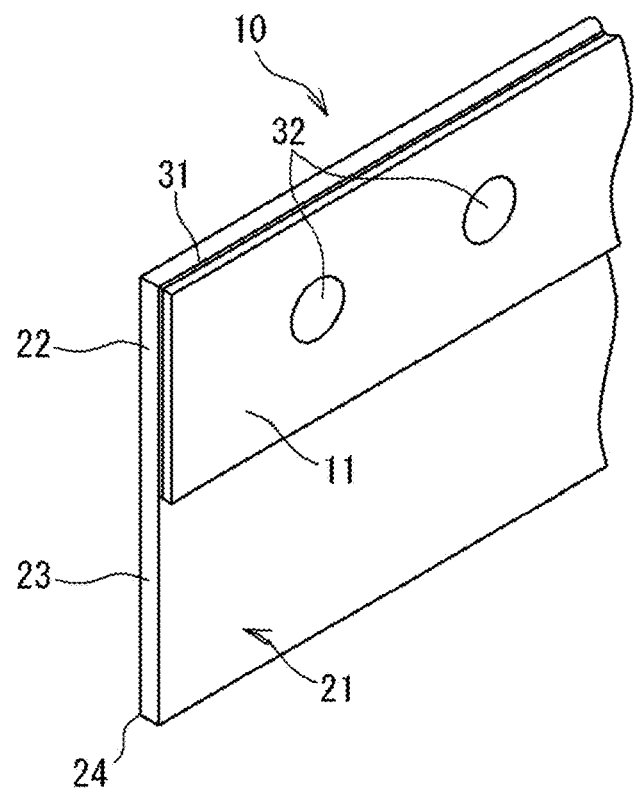
FIG. 1A is a perspective view of a part of a sealing member for machine tools according to a first embodiment.
Figure 1B:
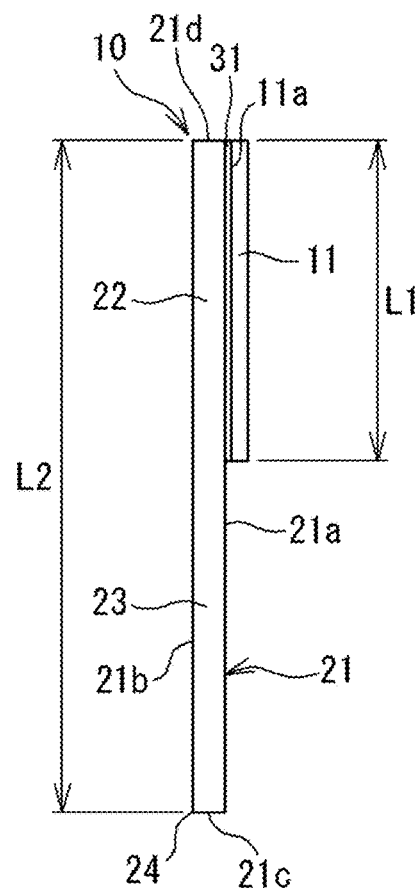
FIG. 1B is a side view of FIG. 1A.
Figure 2:
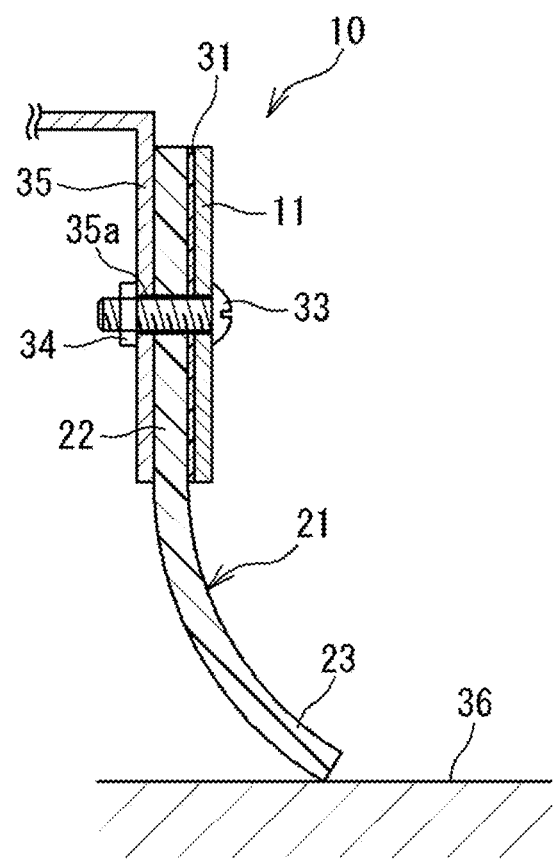
FIG. 2 is a cross-sectional view illustrating a state in which the sealing member for machine tools according to the first embodiment is mounted to a machine tool.
Figure 3:
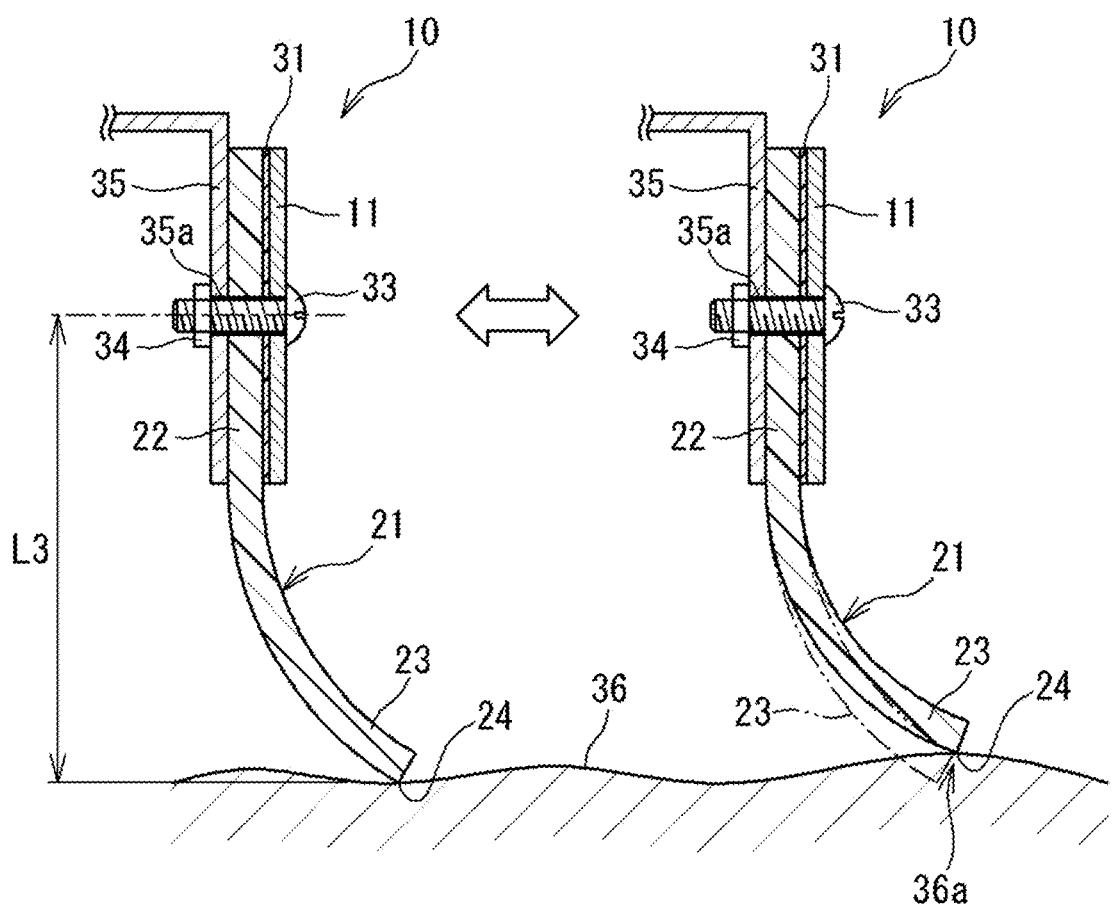
FIG. 3 is a cross-sectional view schematically illustrating a using state of the sealing member for machine tools according to the first embodiment.

FIGS. 1A and 1B are views illustrating a sealing member for machine tools according to a first embodiment. FIG. 1A is a perspective view and FIG. 1B is a side view. FIG. 2 is a cross-sectional view illustrating a state in which the sealing member for machine tools according to the first embodiment is mounted to a machine tool. FIG. 3 is a cross-sectional view schematically illustrating a using state of the sealing member for machine tools according to the first embodiment.

As shown in FIGS. 1A and 1B, a sealing member for machine tools 10 according to the first embodiment includes a support member 11 formed in a flat plate shape, and an elastic member 21 formed in a flat plate shape. The support member 11 has a support surface 11a facing a part of a front surface 21a of the elastic member 21. The support surface 11a is joined to the front surface 21a of the elastic member 21 via an adhesive layer 31. As shown in FIG. 2, the sealing member for machine tools 10 is mounted to a mount portion 35 of a machine tool.

The elastic member 21 is a flat plate member in a natural state before the sealing member for machine tools 10 is mounted to the machine tool. The elastic member 21 is formed by a fixed portion 22 sandwiched between the mount portion 35 and the support surface 11a of the support member 11 and a lip portion 23 not sandwiched between the mount portion 35 and the support surface 11a when the sealing member for machine tools 10 is mounted to the machine tool. The lip portion 23 includes an edge portion 24. The lip portion 23 can be curved.

Accordingly, in the elastic member 21, a distance L2 between a side surface 21c at a side of the edge portion 24 and a side surface 21d that faces the side surface 21c at an opposite side is longer than a distance L1 of the support surface 11a in the same direction.

Further, the sealing member for machine tools 10 includes a plurality of bolt holes 32 for mounting the sealing member for machine tools 10 to the machine tools. Each of the bolt holes 32 is formed to penetrate the support member 11 and the elastic member 21.

As shown in FIG. 2, the sealing member for machine tools 10 is mounted to the mount portion 35 of the machine tool by using a bolt 33 and a nut 34 such that the elastic member 21 is sandwiched between the mount portion 35 of the machine tool and the support member 11.

At this time, the sealing member for machine tools 10 is mounted to the machine tool such that the lip portion 23 of the elastic member 21 is curved to a side opposite to the mount portion 35 of the machine tool, and the edge portion 24 of the elastic member 21 is contacted with a sliding surface 36 of the machine tool.

In the sealing member for machine tools 10 mounted to the machine tool, the edge portion 24 of the elastic member 21 is slid on the sliding surface 36 of the machine tool so that coolant or a chip are prevented from entering into a driving mechanism or the like of the machine tool.

Since the sealing member for machine tools 10 has the configuration described above, contact pressure between the edge portion 24 and the sliding surface 36 is hardly changed when in use (when the sealing member for machine tools 10 is slid on the sliding surface 36 of the machine tool). Thus, the edge portion 24 is hardly worn. Accordingly, in the sealing member for machine tools 10, a time period that can keep the sealing performance becomes remarkably long compared to a conventional sealing member for machine tools.

The reason of this is assumed as described below.

As shown in FIG. 3, unevenness (recess and projection) normally exists on the sliding surface 36 of the machine tool. Thus, a distance (see L3 in FIG. 3) between the mount portion 35 (for example, the bolt hole 35a for fixing the sealing member for machine tools 10) and the sliding surface 36 of the machine tool is not constant.

Thus, when the sealing member for machine tools 10 is slid on a projection part of the sliding surface 36 (for example, a part 36a in FIG. 3), the contact pressure of the edge portion 24 becomes large. In the conventional sealing member for machine tools, the unevenness of the sliding surface 36 is absorbed by the properties of the elastic member or by forming the groove in a part of the elastic member so that an increase of the contact pressure is avoided. However, as described above, it is difficult to avoid the increase of the contact pressure sufficiently in the conventional technique.

Against this, in the sealing member for machine tools 10 according to the present embodiment, as shown in FIG. 3, when the sealing member for machine tools 10 is slid on the projection part of the sliding surface (for example the part 36a), a whole of the lip portion 23 of the elastic member 21 can be deformed little by little. Thus, in the sealing member for machine tools 10, not a specific part of the lip portion 23 but a whole of the lip portion 23 is deformed little by little (a curve state of a whole of the lip portion is changed), and thereby the unevenness of the sliding surface 36 can be absorbed and the increase of the contact pressure of the edge portion 24 can be avoided. In this case, the sealing member for machine tools 10 has excellent wear resistance because the change of the contact pressure when in use is made small.

Further, in the sealing member for machine tools 10, even if the edge portion 24 of the sealing member for machine tools 10 is worn when in use, a whole of the lip portion 23 is deformed little by little. Also in this case, the change of the contact pressure of the edge portion 24 can be made small.

Such an effect becomes more remarkable as a setting value of a distal end pressing amount (a pressing amount of the edge portion) when mounting the sealing member for machine tools to the machine tool becomes large. This is because the edge portion of the sealing member for machine tools is worn more easily as an initial distal end pressing amount becomes large.

Further, in the sealing member for machine tools 10 according to the present embodiment, the edge portion 24 is formed by a side sandwiched between the rear surface 21b and the side surface 21c of the elastic member 21. In such a sealing member for machine tools 10, when the edge portion 24 is contacted with the sliding surface 36 of the machine tool in a state in which the lip portion 23 of the elastic member 21 is curved, a portion adjacent to the edge portion 24 of the rear surface 21b of the elastic member 21 is also contacted with the sliding surface 36. That is, in the sealing member for machine tools 10, the elastic member 21 (the lip portion) and the sliding surface 36 of the machine tool are in surface contact with each other. Thus, the sealing member for machine tools 10 has excellent sealing performance compared to a case in which the elastic member 21 and the sliding surface 36 are in linear contact with each other.

Second Embodiment

Figure 4A:
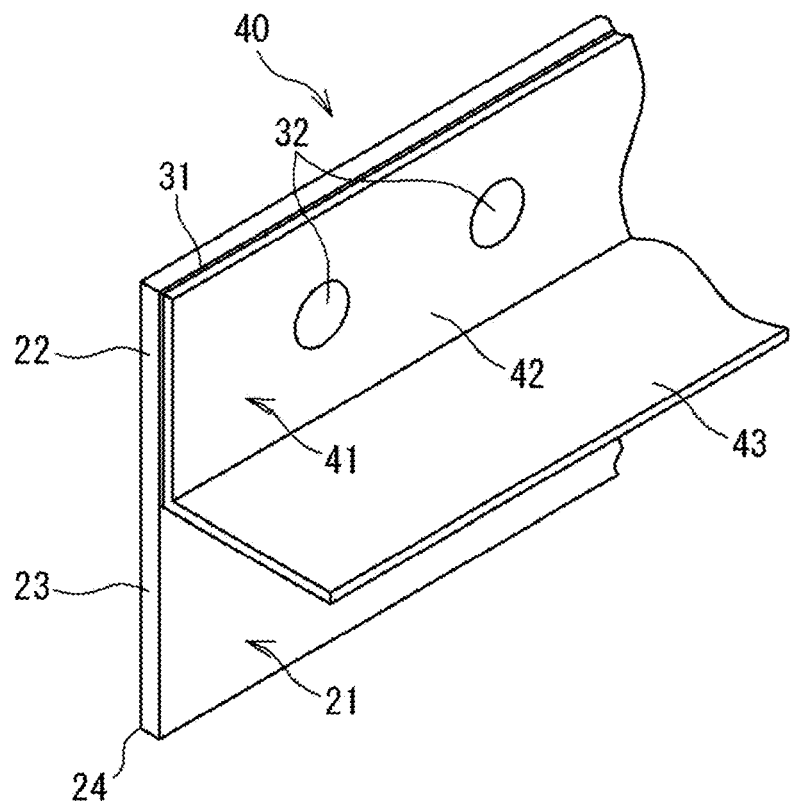
FIG. 4A is a perspective view of a part of a sealing member for machine tools according to a second embodiment.
Figure 4B:
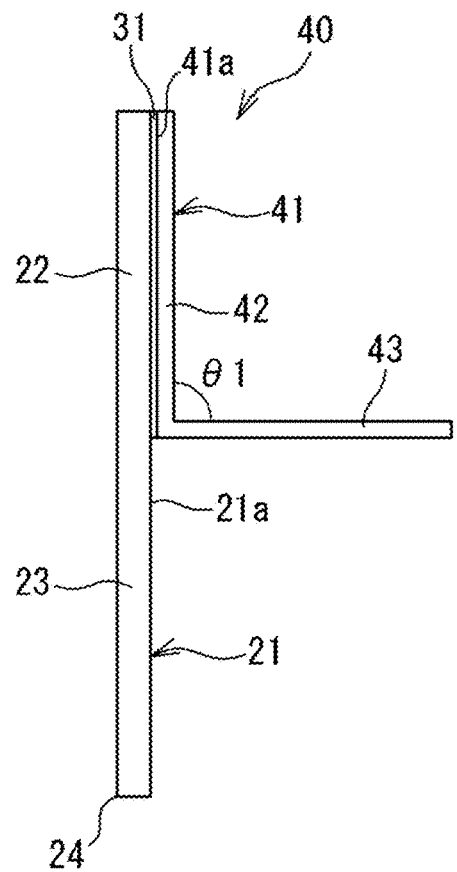
FIG. 4B is a side view of FIG. 4A.

FIGS. 4A and 4B are views illustrating a sealing member for machine tools according to a second embodiment. FIG. 4A is a perspective view, and FIG. 4B is a side view. Here, the same reference sign is assigned to a component in FIGS. 4A and 4B which is the same as that in the sealing member for machine tools according to the first embodiment.

As shown in FIGS. 4A and 4B, in a sealing member for machine tools 40 according to the second embodiment, a shape of a support member 41 is different from that in the first embodiment, and other configuration is similar to that of the sealing member for machine tools according to the first embodiment.

The support member 41 of the sealing member for machine tools 40 includes a support portion 42 formed in a flat plate shape having a support surface 41a facing a front surface 21a of an elastic member 21, and a protection portion 43 formed in a flat plate shape vertically arranged at a side opposite to the support surface 41a of the support portion 42.

Since the support member 41 includes the protection portion 43, the sealing member for machine tools 40 can protect the front surface 21a of the elastic member 21 from a chip when in use. Thus, it can be suppressed that the elastic member 21 is damaged due to collision of the chip when in use.

As the support member 41 including the support portion 42 and the protection portion 43, for example, a metal plate subjected to a bending process can be used. In the support member 41, a bending angle θ1 of the protection portion 43 against the support portion 42 is not especially limited, however the bending angle θ1 is normally set in a range between 80° and 150°.

The sealing member for machine tools 40 is used after mounted to the machine tool by a method as same as that of the sealing member for machine tools 10 according to the first embodiment.

Third Embodiment

Figure 5:
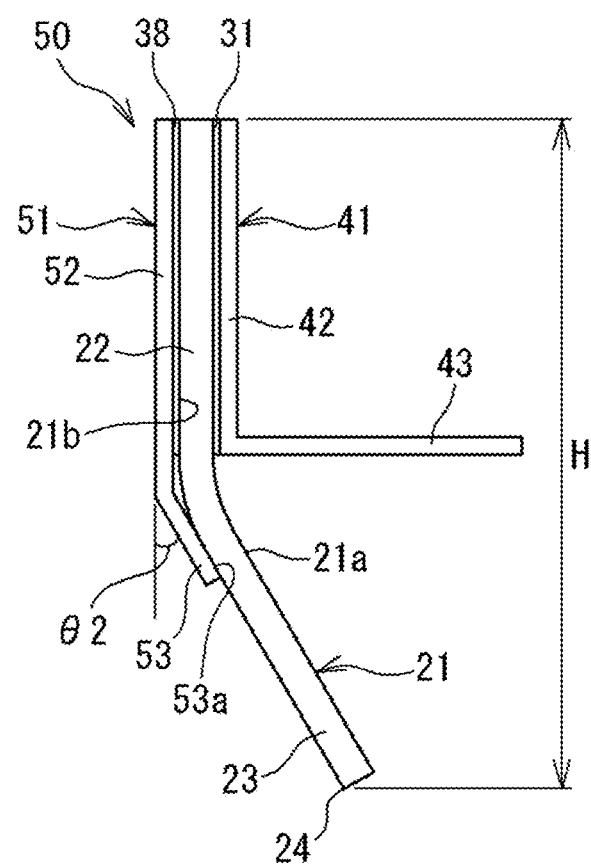
FIG. 5 is a side view of a sealing member for machine tools according to a third embodiment.

FIG. 5 is a cross-sectional view of a sealing member for machine tools according to a third embodiment. Here, the same reference sign is assigned to a component in FIG. 5 which is the same as that in the sealing member for machine tools according to the first and second embodiments.

As shown in FIG. 5, a sealing member for machine tools 50 according to the third embodiment further includes a curve auxiliary member 51 at a side of a rear surface 21b of an elastic member 21 in addition to the configuration of the sealing member for machine tools 40 according to the second embodiment.

The curve auxiliary member 51 includes a body portion 52 formed in a flat plate shape and an auxiliary portion 53 formed in a flat plate shape. The auxiliary portion 53 is obliquely extended from a lower end portion of the body portion 52 to a curve side (a side of a support member 41) of the elastic member 21 (the lip portion 23). Further, the auxiliary portion may be curved.

The body portion 52 of the curve auxiliary member 51 is joined to a part of a rear surface 21b of the elastic member 21 via an adhesive layer 38.

As the curve auxiliary member 51 including the body portion 52 and the auxiliary portion 53, for example, a metal plate subjected to a bending process can be used. In the auxiliary member 51, a bending angle θ2 of the auxiliary portion 53 against the body portion 52 is not especially limited, however the bending angle θ2 is normally set in a range between 15° and 60°.

The sealing member for machine tools 50 according to the present embodiment is used after mounted such that the curve auxiliary member 51, the elastic member 21, and the support member 41 are arranged in this order from a side of a mount portion (not shown) of the machine tool.

Since the sealing member for machine tools 50 includes the curve auxiliary member 51, the sealing member for machine tools 50 is suitable for mounting the sealing member for machine tools 50 to the machine tool without making a mistake with respect to a mount direction of the sealing member for machine tools 50.

Further, in the sealing member for machine tools 50, a curve of the lip portion 23 of the elastic member 21 is supported by the curve auxiliary member 51. Thus, turn-up (reverse of the lip portion 23 of the elastic member 21) of the sealing member for machine tools is hardly generated when in use. Here, the front surface 53a of the auxiliary portion 53 and the rear surface 21b of the elastic member 21 may not be necessarily contacted when in use.

Further, in the sealing member for machine tools 50, the elastic member 21 and the curve auxiliary member 51 (the body portion 52) are joined to each other via the adhesive layer 38, and thereby it is further suitable for preventing the coolant from entering through between the elastic member 21 and the curve auxiliary member 51.

Other Embodiment

In each of the sealing members for machine tools according to the first to third embodiments, the support member and the elastic member, and the elastic member and the curve auxiliary member are joined via the adhesive layers. However, in each of the sealing members for machine tools according to the embodiments of the present invention, the support member and the elastic member, and the elastic member and the curve auxiliary member are not necessarily joined via the adhesive layers, and therefore they may merely physically adhere to each other. In this case, each of the support member, the elastic member and the curve auxiliary member can be replaced independently.

In the sealing members for machine tools according to the embodiments of the present invention, the sealing member for machine tools according to the third embodiment may include a support member formed in a flat plate shape similar to the support member of the sealing member for machine tools according to the first embodiment.

In the sealing members for machine tools according to the embodiments of the present invention, the elastic member formed in a flat plate shape is not limited to a perfect rectangular parallelepiped, and for example, a C-chamfered shape or an R-chambered shape subjected to the edge portion described above may be adopted. Further, the elastic member described above may be formed in a shape tapered (a thickness is reduced) continuously or intermittently toward the edge portion in a cross-sectional shape (a shape in a plane orthogonal to the longitudinal direction).

Next, each component of the sealing member for machine tools is described.

(Support Member)

The support member is formed to firmly fix the elastic member to the machine tool. As a material of the support member, a metal material such as steel and aluminum is generally preferable from a viewpoint of durability and strength. The material of the support member may be ceramic, rigid plastic, or the like.

Further, as the material of the support member, a steel plate with an untreated surface, a steel plate subjected to surface treatment such as zinc phosphate treatment, chromate treatment, and anti-rust resin treatment, an elastic metal plate such as phosphor copper and spring steel, and the like may be adopted.

In order to improve conformability of the support member to the adhesive layer sandwiched between the support member and the front surface of the elastic member, surface treatment by using primer may be applied to the support member.

Further, surface roughening treatment may be applied to the surface of the support member (in particular, a region to be contacted with the elastic member via the adhesive layer) in order to improve adhesiveness by using an anchor effect.

(Elastic Member)

The elastic member is formed to slide on the sliding surface of the machine tool. In the elastic member, the edge portion is contacted with the sliding surface of the machine tool.

Normally, oil resistance is required to the sealing member for machine tools, and therefore examples of the material of the elastic member include NBR (nitrile butadiene rubber), urethane elastomer, fluororubber, silicon rubber, and EPDM (ethylene-propylene-diene rubber).

Of these materials, the urethane elastomer is preferable because durability (wear resistance) is superior for keeping desirable properties for a long period of time.

Examples of the urethane elastomer include a product obtained by reaction with a polyol and a polyisocyanate, and a crosslinker as necessary.

The polyol is not especially limited. Examples of the polyol include polyester polyol, polyether polyol, and polycaprolactone polyol.

It is preferable that the number average molecular weight of the polyol is in a range between 1000 and 3000. By using the polyol within the range described above, a chip and coolant can be further firmly prevented from entering when in use.

The number average molecular weight is a measurement value in terms of polystyrene measured by the GPC (Gel Permeation Chromatography) measurement.

Example of the polyester polyol includes polyester polyol obtained by reacting dicarboxylic acid and glycol in accordance with a routine procedure.

Examples of the dicarboxylic acid include aromatic dicarboxylic acid such as terephthalic acid, isophthalic acid, and 2,6-naphthalene dicarboxylic acid; aliphatic dicarboxylic acid such as adipic acid, azelaic acid, and sebacic acid; oxycarbonic acid such as oxybenzoic acid; and its ester-forming derivative. Of these dicarboxylic acids, the adipic acid is preferable because of its excellent wear resistance.

Examples of the glycol include aliphatic glycol such as ethylene glycol, 1,4-butanediol, diethylene glycol, neopentyl glycol, 3-methyl-1,5-pentanediol, 1,9-nonanediol, triethylene glycol; alicyclic glycol such as 1,4-cyclohexane dimethanol; aromatic diol such as p-xylene diol; and polyoxyalkylene glycol such as polyethylene glycol, polypropylene glycol, and polytetramethylene glycol. As the glycol, the aliphatic glycol is preferable, and the ethylene glycol and the 1,4-butanediol are more preferable.

The polyester polyol, which is a reactant of dicarboxylic acid and glycol, has a linear structure, however branched polyester using a trivalent or more ester forming component may be adopted.

Examples of the polyether polyol include polyalkylene glycols such as polyethylene glycol, polypropylene glycol, polytetramethylene glycol, and copolymers thereof. Of these polyester polyols, the polytetramethylene glycol is preferable because of its excellent wear resistance.

Example of the polycaprolactone polyol includes polycaprolactone polyol obtained by the ring opening addition of ε-caprolactone using low molecular weight glycol as an initiator in the presence of a catalyst.

As the low molecular weight glycol, dihydric alcohol such as ethylene glycol, propylene glycol, 1,3-butylene glycol, and neopentyl glycol; or trihydric alcohol such as trimethylene glycol, and glycerin is preferably used.

Examples of the catalyst include an organotitanium-based compound such as tetrabutyl titanate, tetrapropyl titanate, and tetraethyl titanate; and a tin-based compound such as tin octylate, dibutyl tin oxide, dibutyl tin laurate, stannous chloride, and stannous bromide.

Here, when performing the ring opening addition of the ε-caprolactone, other ring lactone such as trimethyl caprolactone and valerolactone may be mixed in part in addition to the ε-caprolactone.

The polyol may be used independently or two or more kinds of the polyols may be used together.

The polyisocyanate is not especially limited, and therefore conventional known polyisocyanate may be used. Examples of the polyisocyanate include aliphatic isocyanate, alicyclic isocyanate, and aromatic isocyanate. Of these polyisocyanates, the aromatic isocyanate is preferable because of its excellent wear resistance.

Examples of the aliphatic isocyanate include 1,6-hexamethylene diisocyanate (HDI), 2,2,4-trimethylhexamethylene diisocyanate, and lysine diisocyanate. Further, examples of the aliphatic isocyanate also include modified products such as isocyanurate, biuret and adduct of hexamethylene diisocyanate or isophorone diisocyanate.

Examples of the alicyclic isocyanate include isophorone diisocyanate (IPDI), 4,4'-dicyclohexylmethane diisocyanate, 1,4-cyclohexane diisocyanate, and norbornane diisocyanate (NBDI).

Examples of the aromatic isocyanate include 4,4'-diphenylmethane diisocyanate, polymethylene polyphenylene polyisocyanate, a compound of diphenylmethane diisocyanate and polymethylene polyphenylene polyisocyanate (hereinafter, these are also collectively referred to as MDI); tolylene diisocyanate (TDI), phenylene diisocyanate, 1,5- naphthalene diisocyanate, xylylene diisocyanate (XDI), carbodiimide-modified MDI, and urethane-modified MDI.

The polyisocyanate is used independently or two or more kinds of the polyisocyanates may be used together.

Examples of the crosslinking agent include ethylene glycol, propylene glycol, butanediol, hexanediol, diethylene glycol, trimethylolpropane, glycerin, hydrazine, ethylenediamine, diethylenetriamine, 4,4'-diaminodiphenyl methane, 4,4'-diaminodicyclohexyl methane, N,N-bis (2-hydroxypropyl) aniline, and water.

Of these crosslinking agents, the butanediol and the trimethylolpropane are preferable because of their excellent oil resistance.

The crosslinking agent may be used independently or two or more kinds of the crosslinking agents may be used together.

The polyurethane elastomer can be produced by a known method using the materials described above. Specifically, for example, the polyurethane elastomer can be produced by adjusting an equivalent ratio of NCO/OH of each material is set to 0.9 to 1.1 and by reacting the materials in an appropriate organic solvent using a catalyst as needed, or by subjecting the materials to melting reaction without using a solvent.

The polyurethane elastomer can be produced by a one shot method, a prepolymer method, or the like.

A molding method of the elastic member is not especially limited. Examples of the molding method include atmospheric pressure cast molding, reduced pressure cast molding, centrifugal casting, continuous rotation molding, extrusion molding, injection molding, reactive injection molding (RIM), and spin coating.

Of these molding methods, the centrifugal casting and the continuous rotation molding are preferable.

A hardness of the elastic member (JIS A hardness) is preferably set in a range between 55° and 90°.

In a case in which the hardness of the elastic member is less than 55°, the elastic member is deformed largely when sliding on the sliding surface of the machine tool, and therefore a chip or the like might not be prevented from entering firmly. On the other hand, in a case in which the hardness of the elastic member is more than 90°, the elastic member is too hard and therefore the elastic member might be damaged when sliding. The hardness of the elastic member is more preferably set in a range between 60° and 75°.

The JIS A hardness is a value measured by a spring type A hardness testing machine in accordance with JIS K 7312.

An impact resilience of the elastic member is preferably set in a range between 10% and 50%.

By setting the impact resilience of the elastic member in the range described above, the elastic member follows the unevenness of the sliding surface further easily and abnormal noise (chattering noise) in sliding is suppressed easily. The impact resilience of the elastic member is more preferably set in a range between 20% and 40%.

The impact resilience is a value measured in accordance with JIS K 7312.

The elastic member may contain various additives. By adding the additive into the elastic member, for example, the hardness, a friction coefficient, or the like of the elastic member can be adjusted.

Examples of the additive include powder formed of metal such as metal oxide such as cerium oxide, zinc oxide, iron oxide and silica, metal such as copper, nickel, iron and aluminum; short fiber formed of metal such as aluminum, stainless steel and iron, or short fiber formed of resin such as polyamide; and hollow particles such as glass balloon and fly ash balloon.

A content of the additive is preferably set in a range between 1 and 100 parts by weight against 100 parts by weight of the rubber component (elastomer component).

As the additive, the powder of metal oxide is preferable because the metal oxide easily conforms to the rubber component (elastomer component) and the metal oxide is chemically stable, and the powder of cerium oxide is more preferable.

The elastic member may contain, for example, a chain extender compounded in raw material, a reaction assistant such as a crosslinking promoter and a crosslinking retarder, a hydrolysis inhibitor, a colorant, a light stabilizer, a heat stabilizer, an antioxidant, a mildew proofing agent, a flame retardant, an extender, in addition to the additive described above.

(Adhesive Layer)

The adhesive layer that fixes the elastic member and the support member, and the adhesive layer that fixes the elastic member and the curve auxiliary member are not especially limited. The adhesive layer may be appropriately determined in consideration of materials of each member.

Examples of the adhesive layer include EVA-based, polyamide-based, or polyurethane-based hot melt adhesive, and a curing type adhesive. Further, for example, a double-sided adhesive tape is also included in the adhesive layer.

The adhesive layer that joins the elastic member and the support member and the adhesive layer that joins the elastic member and the curve auxiliary member may be formed of the same material or different materials.

A thickness of the adhesive layer is not especially limited, however the thickness is preferably set in a range between 50 µm and 500 µm.

The sealing member for machine tools according to each embodiment of the present invention can be used as a seal member for protecting a working portion, a driving mechanism or the like in various machine tools such as a lathe and a machining center, from a chip, coolant or the like. The sealing member for machine tools can be used as a lip seal, a slide seal, a telescopic seal, a cover seal, or the like.

The sealing member for machine tools according to each embodiment of the present invention is especially suitable to a lip seal.

EXAMPLE

Hereinafter, the embodiment of the present invention is more specifically described with reference to examples, however the embodiment of the present invention is not limited to examples described below.

Example 1

Forming Support Member

A steel plate having a thickness of 0.8 mm (Green Coat GX-K2 produced by Kobe Steel, Ltd.) was cut into a size of 34 mm×600 mm. And then, a part of 18 mm from one long side of the steel plate was bent to be parallel to the long side by 90° so that the support member 41 having an L-shape shown in FIG. 5 (θ1=90°) was formed. In the support member 41, a portion of 18 mm from the one long side corresponds to the support portion 42, and the remaining portion corresponds to the protection portion 43.

Forming Elastic Member

Prepolymer was obtained by adding 39.5 parts by weight of pure MDI (Millionate MT produced by Tosoh Corporation) into 100 parts by weight of polyethylene adipate ester diol (SANESTER 2620 having a hydroxy value of 56.1 mgKOH/g produced by Sanyo Chemical Industries, Ltd.) and by defoaming them under reduced pressure at an atmosphere of 75° C. and then by reacting them for 8 hours while agitating them at the same temperature atmosphere. A NCO concentration of the prepolymer was 6.5%.

After that, an urethane composition was prepared by adding 4.0 parts by weight of powder of cerium oxide (Seriko CH-BS302 produced by TAIYO KOKO CO., LTD.), 6.14 parts by weight of 1,4-butanediol (produced by Mitsui Chemicals, Inc.) and 0.683 parts by weight of trimethylolpropane (produced by MITSUBISHI GAS CHEMICAL COMPANY, INC.) into the obtained prepolymer and then by agitating and mixing them.

After that, the obtained urethane composition was entered into a centrifugal molding machine and the urethane composition was crosslinked in a condition of a molding die temperature of 150° C. and a crosslinking time of 60 minutes, and then a cylindrical cured product having a thickness of 1.6 mm was molded and released from the molding die. After that, one part of the cured product was cut to be developed into a plate shape, and then post-crosslinking was performed in a condition of 120° C. in a blower oven for 12 hours, so that a polyurethane raw sheet was obtained.

Next, the raw sheet was cut into a sheet of a width 36 mm and a length of 600 mm so that the elastic member formed of the urethane sheet was obtained. The JIS A hardness of the urethane sheet was 78°.

Here, the JIS A hardness of the urethane sheet was measured in accordance with JIS K 7312. The JIS A hardness was measured by laminating ten sheets of the urethane sheet having a thickness of 1.6 mm.

Forming Curve Auxiliary Member

A steel plate having a thickness of 0.8 mm (Green Coat GX-K2 produced by Kobe Steel, Ltd.) was cut into a size of 24 mm×600 mm. And then, a part of 20 mm from one long side of the steel plate was bent to be parallel to the long side by 30° so that the curve auxiliary member 51 shown in FIG. 5 ($\theta 2=30°$) was formed. In the curve auxiliary member 51, a portion of 20 mm from the one long side is the main portion 52, and the remaining portion is the auxiliary portion 53.

Producing Machine Tool Seal Member

The support member was fixed at a predetermined position on the front surface of the elastic member by using a double-sided tape having a width of 5 mm (No. 500 produced by Nitto Denko Corporation). Next, the curve auxiliary member was fixed on a predetermined position of the rear surface of the elastic member by using the double-sided tape. After that, a plurality of bolt holes was formed so that the sealing member for machine tools having the shape shown in FIG. 5 was produced.

Here, a height (H in FIG. 5) of the produced sealing member for machine tools is 32 mm.

Comparative Example 1

A slide seal produced by Nitta Corporation (Nitta slide seal GW-LPV1) is adopted as a sealing member for machine tools according to the present comparative example.

[Evaluation]

The sealing members for machine tools produced in the example and the comparative example were mounted to a CNC lathe (NLX3000 produced by DMG MORI CO., LTD.). After that, each of the sealing members for machine tools was used for seven months in the following use condition, and a state of each of the edge portion after use was observed.

Use Condition

Working time: 7.5 hours/day. Working rate: approximately 50%.

Cut material: iron or aluminum (each of which includes casting).

Coolant: synthetic type coolant (Moresco Bio60E produced by MORESCO Corporation). Here, the coolant was used by diluting a raw liquid to 20 times (volume base) with tap water.

Figure 6:
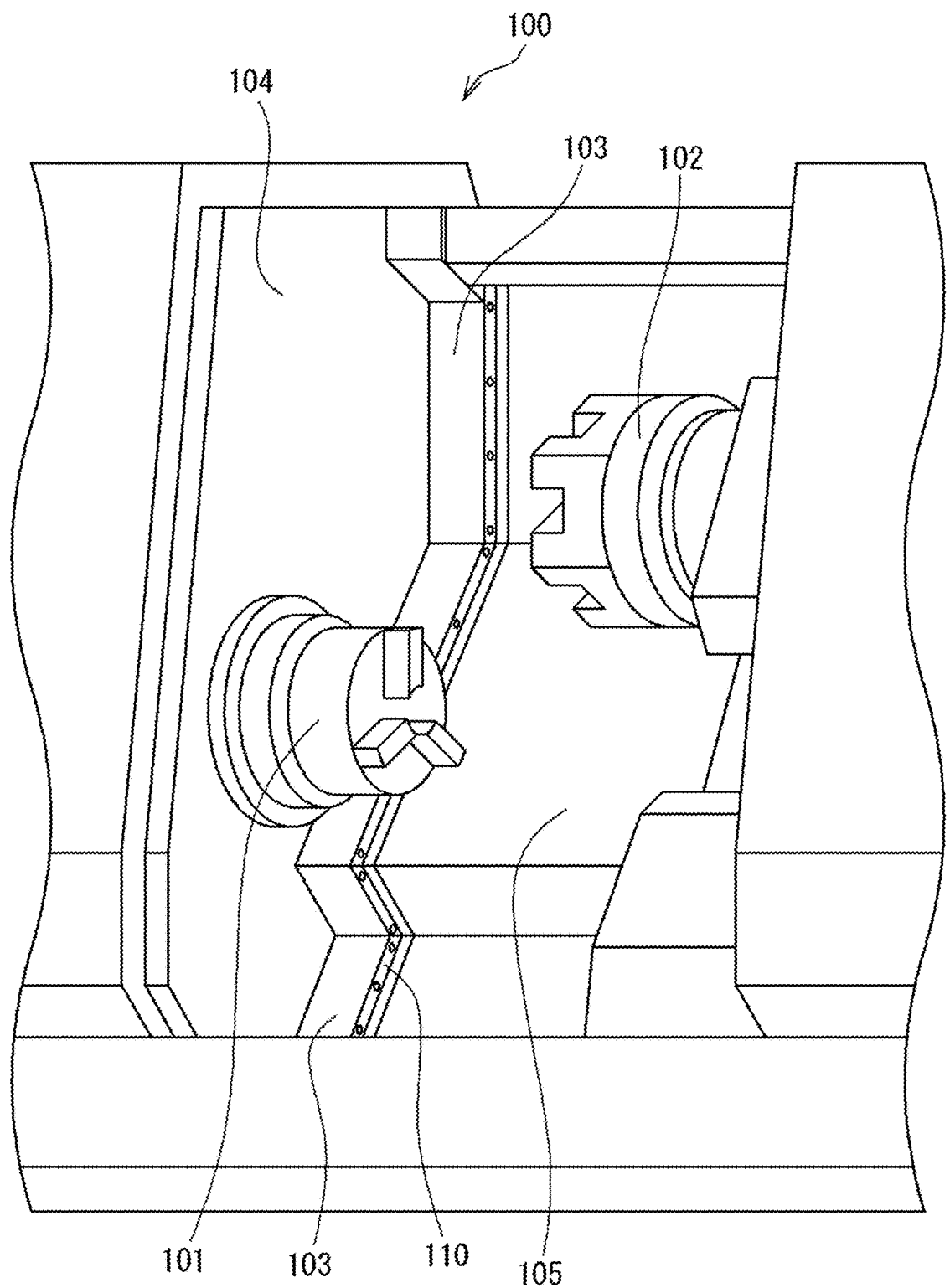
FIG. 6 is a schematic view for describing a mount portion of a sealing member for machine tools in evaluation of an example and a comparative example.

Mount portion: see FIG. 6.

FIG. 6 is a schematic view for describing the mount portion of the sealing member for machine tools.

A lathe 100 used in the present evaluation include a main spindle 101 supported in a rotatable manner by a headstock (not shown), and a tool rest 102 mounted on a guide rail (not shown) in a movable manner along an axial direction of the main spindle 101. Fixed covers 103, 104 that protect the headstock, and a moving cover 105 that moves together with the tool rest 102 are arranged in the lathe 100. The lathe 100 prevents a chip or coolant from being scattered to the outside of a cutting space and from adhering to the headstock or the guide rail, by these covers 103, 104, 105.

The present evaluation was performed by mounting a sealing member for machine tools 110, which seals a gap between the fixed cover 103 and the moving cover 105 and prevents a chip or coolant from entering into the gap, to a side end surface of the fixed cover 103 facing the moving cover 105.

The dynamic friction coefficient of the edge portion of each of the sealing members for machine tools according to the example and the comparative example before and after the sealing member for machine tools 110 is mounted to the CNC lathe (before and after the use of the sealing member for machine tools 110) was measured by the following method.

Figure 7A:
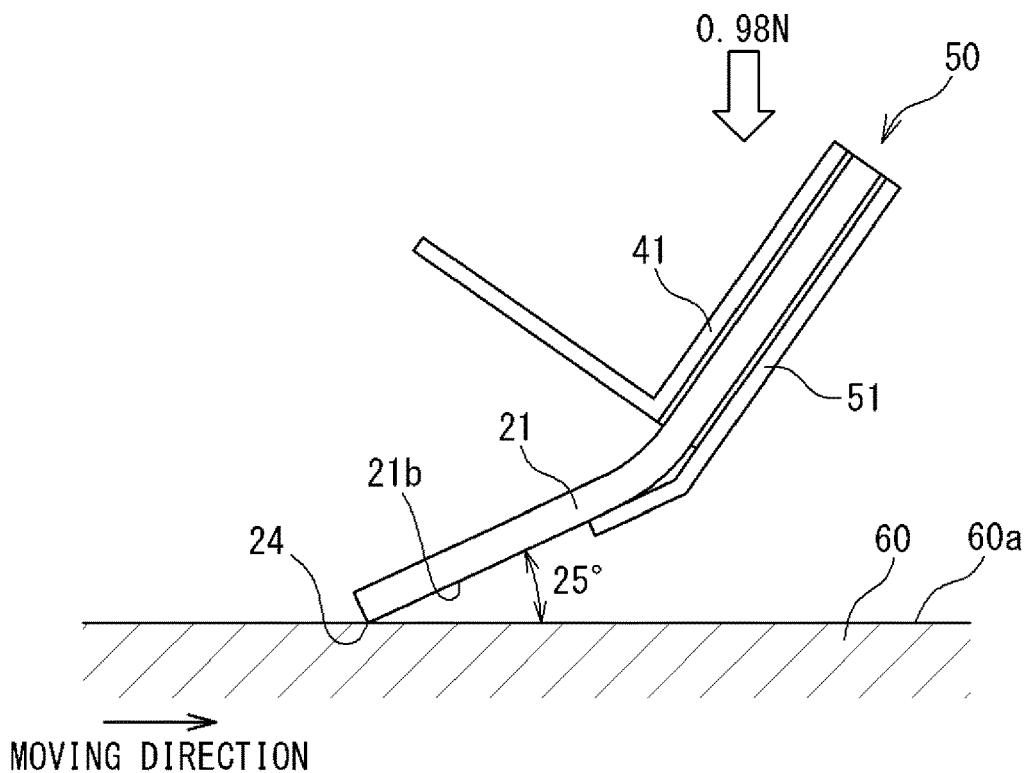
FIG. 7A is a schematic view illustrating a method of measuring a dynamic friction coefficient of a sealing member for machine tools according to Example 1.

The dynamic friction coefficient was measured by using the Heidon type surface property tester (HEIDON-14DR). FIG. 7A is a schematic view illustrating a method of measuring the dynamic friction coefficient of the sealing member for machine tools according to Example 1. FIG. 7A is a schematic view illustrating a method of measuring the dynamic friction coefficient of the sealing member for machine tools according to Comparative Example 1.

Dynamic Friction Coefficient of the Sealing Member for Machine Tools According to Example 1 (See FIG. 7A)

The edge portion 24 of the sealing member for machine tools 50 was brought into contact with a PET sheet 60 such that an angle between the rear surface 21b of the elastic member 21 and a surface (mirror surface) 60a of the PET sheet 60 is to be 25°. Further, the edge portion 24 was pressed against the PET sheet 60 by applying a vertical load of 0.98 N to the sealing member for machine tools 50 downward in the vertical direction from an upper side of the support member 41. Here, in FIG. 7A, the reference sign 51 denotes the curve auxiliary member.

After that, the PET sheet 60 was moved horizontally at a moving speed of 1500 mm/minute (a moving direction is a direction from a left side to a right side of FIG. 7A). A horizontal load F (N) at this time when in the stably sliding excluding an initial peak resistance was detected by a load cell and recorded. Next, a record chart was processed in calculation averaging processing by using an analyzer so that the dynamic friction coefficient was calculated.

Figure 7B:
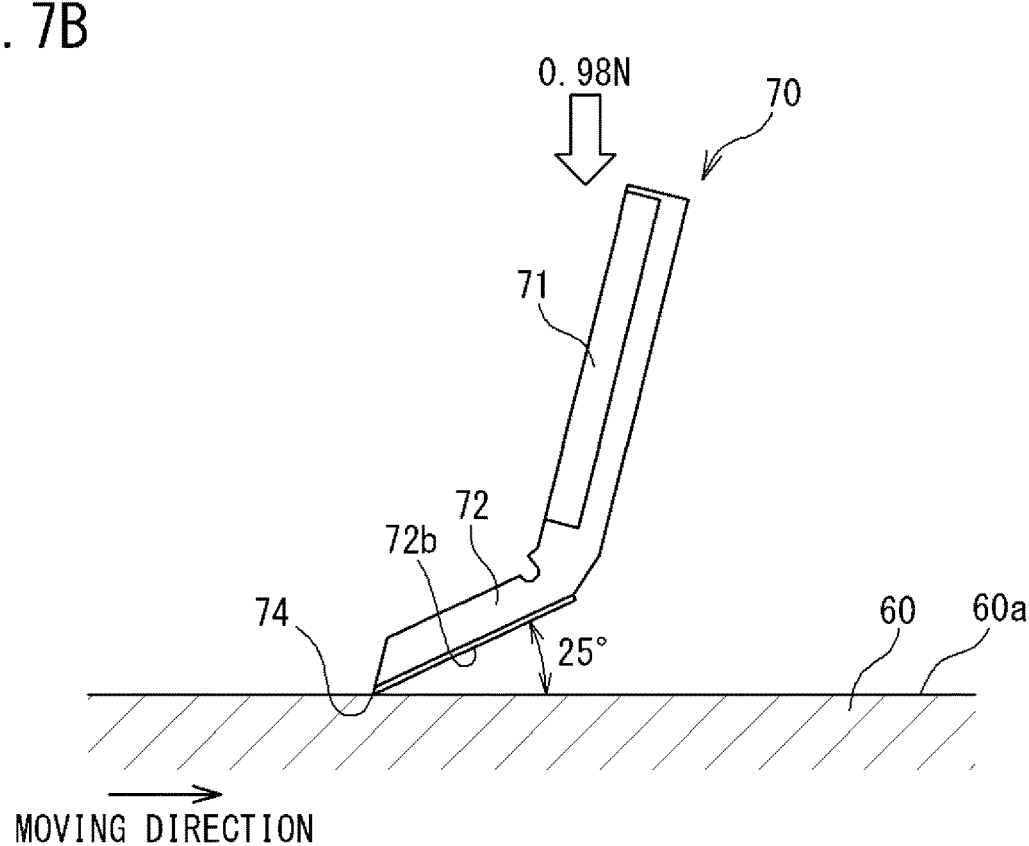
FIG. 7B is a schematic view illustrating a method of measuring a dynamic friction coefficient of a sealing member for machine tools according to Comparative Example 1.

Dynamic Friction Coefficient of the Sealing Member for Machine Tools According to Comparative Example 1 (See FIG. 7B)

An edge portion 74 of a sealing member for machine tools 70 was brought into contact with the PET sheet 60 such that an angle between a rear surface 72b of a lip portion 72 and the surface (mirror surface) 60a of the PET sheet 60 is to be 25°. Further, the edge portion 74 was pressed against the PET sheet 60 by applying a vertical load of 0.98 N to the sealing member for machine tools 70 downward in the vertical direction from an upper side of a reinforcing plate 71.

After that, the PET sheet 60 was moved horizontally at a moving speed of 1500 mm/minute (a moving direction is a direction from a left side to a right side of FIG. 7B). A horizontal load F (N) at this time when in the stably sliding excluding an initial peak resistance was detected by a load cell and recorded. Next, a record chart was processed in calculation averaging processing by using the analyzer so that the dynamic friction coefficient was calculated.

Each measurement of the dynamic friction coefficient described above was performed in an environment of a temperature of 20° C. to 25° C. and a relative humidity of 40% to 55%.

Further, in each measurement, the measurement of the dynamic friction coefficient of the sealing member for machine tools before the use was performed in a dry condition in a state in which the surface 60a of the PET sheet 60 is clean, and the measurement of the dynamic friction of the sealing member for machine tools after the use was performed in a wet condition in which the surface 60a of the PET sheet 60 is wet with the coolant. The wet condition was set to a state in which approximately 5 ml of 20 times diluted aqueous solution of Moresco Bio60E was dropped on the contact portion of the PET sheet with the edge portion of the sealing member for machine tools.

(Result)

Dynamic Friction Coefficient Dynamic Friction Coefficient Before the Use: Example 1=0.44, Comparative Example 1=0.23.

Dynamic friction coefficient after the use: Example 1=0.49, Comparative Example 1=0.81.

Working in CNC Lathe

Figure 8:
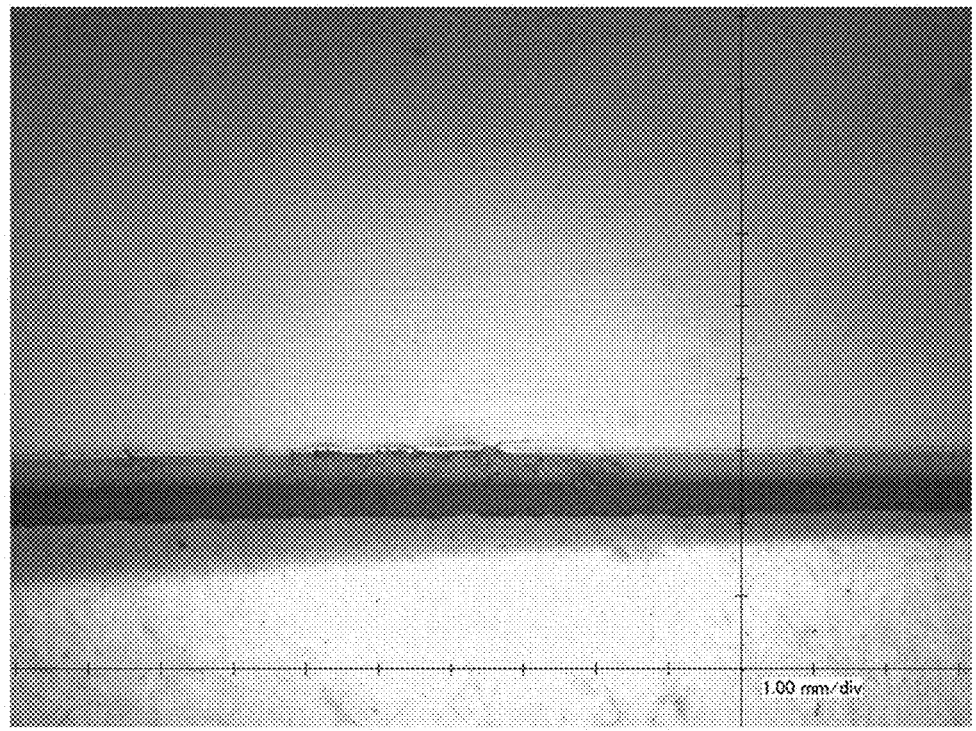
FIG. 8 is a photo showing a state of an edge portion after the evaluation of the sealing member for machine tools according to Example 1.

In the sealing member for machine tools according to Example 1, an abrasion mark was observed near the edge portion 24 in the lip portion of the elastic member after used for seven months, however wear of the edge portion 24 was hardly observed (see FIG. 8).

Figure 9:
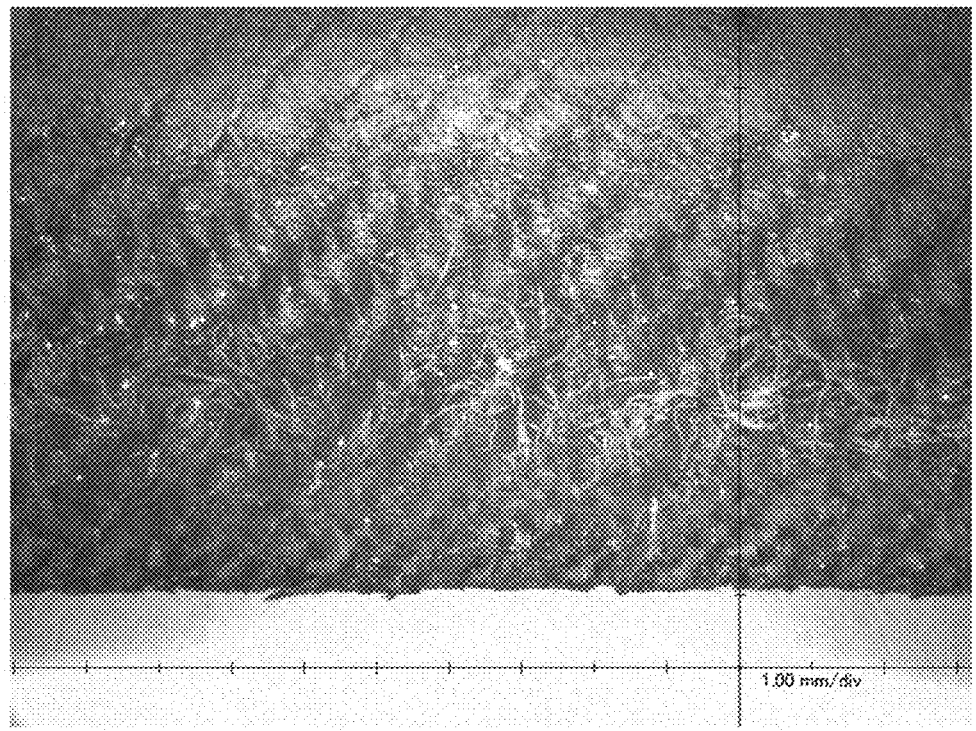
FIG. 9 is a photo showing a state of an edge portion after the evaluation of the sealing member for machine tools according to Comparative Example 1.
Figure 10:
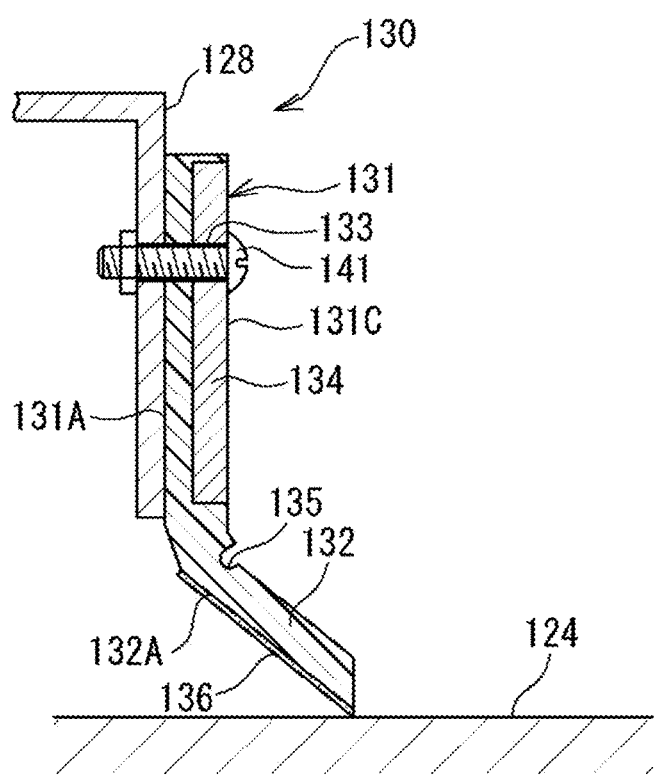
FIG. 10 is a cross-sectional view illustrating one example of a conventional sealing member for machine tools.

On the other hand, in the sealing member for machine tools according to Comparative Example 1, wear of the edge portion was observed after used for seven months, and exposure of fiber due to disappearance of the rubber was observed (see FIG. 9).

Further, after the evaluation, the sealing member for machine tools was removed, and a state of the machine tool was observed.

As a result, in Example 1, entering of chips into the gap between the fixed cover 103 and the moving cover 105 was observed, however the number of the chips is merely several number. On the other hand, in Comparative Example 1, entering of a large number of the chips into the gap between fixed cover 103 and the moving cover 105 was observed.

REFERENCE SIGNS LIST 10, 40, 50: SEALING MEMBER FOR MACHINE TOOLS
11, 41: SUPPORT MEMBER
11a, 41a: SUPPORT SURFACE
21: ELASTIC MEMBER
21a: FRONT SURFACE
22: FIXED PORTION
23: LIP PORTION
24: EDGE PORTION
31, 38: ADHESIVE LAYER
35: MOUNT PORTION
36: SLIDING SURFACE
42: SUPPORT PORTION
43: PROTECTION PORTION
51: CURVE AUXILIARY MEMBER
52: BODY PORTION
53: AUXILIARY PORTION
100: LATHE

The invention claimed is:

1. A wiper for machine tools comprising:
a support member;
an elastic member formed in a flat plate shape, the elastic member comprising an edge portion to be slid on a sliding surface of a machine tool; and
a bolt hole for mounting the wiper for machine tools to the machine tools,
wherein:
the support member comprises a support surface facing a part of a front surface of the elastic member;
the support member does not slide on the sliding surface of the machine tool,
the support member comprises a protection portion arranged at a side opposite to the support surface,
the bolt hole is formed to penetrate the support member and the elastic member,
the wiper for machine tools is mounted to the machine tool such that the elastic member is sandwiched between a mount portion of the machine tool and the support surface of the support member; and
the elastic member comprises a fixed portion sandwiched between the mount portion and the support member and a lip portion not sandwiched between the mount portion and the support member when the wiper for machine tools is mounted to the machine tool, the lip portion including the edge portion and configured to be curved, wherein the edge portion is located at a rear surface side of the elastic member.

2. The wiper for machine tools according to claim 1, wherein the support surface of the support member and the front surface of the elastic member are joined via an adhesive layer.

3. The wiper for machine tools according to claim 1, further comprising a curve auxiliary member at a side of a rear surface of the elastic member, wherein
the curve auxiliary member includes a body portion formed in a flat plate shape and an auxiliary portion extended from the body portion toward a side of a curve of the elastic member and
the bolt hole is formed to penetrate the support member, the elastic member, and the curve auxiliary member.

4. The wiper for machine tools according to claim 3, wherein a rear surface of the elastic member and a body portion of the curve auxiliary member are joined via an adhesive layer.

5. The wiper for machine tools according to claim 1, wherein a bending angle between the support portion and the protection portion is from 80° to 150°.

6. The wiper for machine tools according to claim 1, wherein a support member side of the elastic member is a front surface and a mounting part side of the elastic member is the rear surface.

\* \* \* \* \*